(12) United States Patent
Kim

(10) Patent No.: US 11,001,258 B2
(45) Date of Patent: *May 11, 2021

(54) LANE KEEPING ASSIST SYSTEM AND METHOD FOR IMPROVING SAFETY IN PRECEDING VEHICLE FOLLOWER LONGITUDINAL CONTROL

(71) Applicant: MANDO CORPORATION, Pyeongtaek-si (KR)

(72) Inventor: Soon Tae Kim, Yongin-si (KR)

(73) Assignee: MANDO CORPORATION, Pyeongtaek-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/556,932

(22) Filed: Aug. 30, 2019

(65) Prior Publication Data

US 2019/0382008 A1    Dec. 19, 2019

Related U.S. Application Data

(63) Continuation of application No. 16/218,163, filed on Dec. 12, 2018.

(30) Foreign Application Priority Data

Apr. 27, 2018    (KR) .................. 10-2018-0049216

(51) Int. Cl.
*B60W 30/12*    (2020.01)
*B60W 30/165*    (2020.01)
(Continued)

(52) U.S. Cl.
CPC .......... *B60W 30/12* (2013.01); *B60W 30/165* (2013.01); *G06K 9/00798* (2013.01);
(Continued)

(58) Field of Classification Search
None
See application file for complete search history.

(56) References Cited

U.S. PATENT DOCUMENTS 9,545,922 B1* 1/2017 Sim ...................... B60W 30/12
10,249,195 B2* 4/2019 Sim ........................ G08G 1/167
(Continued)

FOREIGN PATENT DOCUMENTS

DE    10 2013 002 889 A1    8/2014
JP    2000-020896 A    1/2000
(Continued)

OTHER PUBLICATIONS

Extended European Search Report dated Nov. 20, 2019 in European Application No. 18213229.0.

*Primary Examiner* — Jonathan M Dager
(74) *Attorney, Agent, or Firm* — Morgan, Lewis & Bockius LLP

(57) ABSTRACT

A lane keeping assist system for performing lane keeping using information about a lane and peripheral vehicle may include an image sensor configured to detect a forward lane and a preceding vehicle with respect to a host vehicle, and an electronic control unit (ECU) configured to control a traveling direction of the host vehicle in a manner that the host vehicle follows a traveling route within the detected lane, perform a preceding vehicle follower control to control the traveling direction of the host vehicle in a manner that the host vehicle follows the preceding vehicle if the lane is not detected, and restrict a follower longitudinal control if the preceding vehicle deviates from an expected path of travel.

21 Claims, 6 Drawing Sheets

(51) Int. Cl.
*G06K 9/00* (2006.01)
*G08G 1/16* (2006.01)

(52) U.S. Cl.
CPC ..... *G08G 1/167* (2013.01); *B60W 2554/4041* (2020.02); *B60W 2554/801* (2020.02)

(56) References Cited

U.S. PATENT DOCUMENTS

| | | | | |
|---|---|---|---|---|
| 2003/0156015 | A1* | 8/2003 | Winner | B60W 30/16 340/425.5 |
| 2004/0215393 | A1* | 10/2004 | Matsumoto | B62D 15/025 701/300 |
| 2004/0230375 | A1* | 11/2004 | Matsumoto | B60W 30/12 701/301 |
| 2005/0125125 | A1* | 6/2005 | Matsumoto | B62D 15/029 701/41 |
| 2005/0240328 | A1* | 10/2005 | Shirato | B62D 1/286 701/41 |
| 2009/0182505 | A1* | 7/2009 | Ikeda | G01S 13/931 701/301 |
| 2009/0216405 | A1* | 8/2009 | Kudo | B62D 15/025 701/41 |
| 2009/0234553 | A1* | 9/2009 | Sekiguchi | B60W 30/16 701/96 |
| 2010/0030430 | A1* | 2/2010 | Hayakawa | B60W 30/08 701/42 |
| 2010/0100284 | A1* | 4/2010 | Kudo | B62D 15/025 701/42 |
| 2011/0320163 | A1* | 12/2011 | Markkula | B60W 40/072 702/150 |
| 2014/0032108 | A1* | 1/2014 | Zeng | G08G 1/167 701/533 |
| 2014/0361882 | A1* | 12/2014 | Akiyama | G08G 1/16 340/435 |
| 2014/0379166 | A1* | 12/2014 | Kaneko | G08G 1/167 701/1 |
| 2015/0206017 | A1* | 7/2015 | Sakamoto | G08G 1/167 382/103 |
| 2015/0266422 | A1* | 9/2015 | Chundrlik, Jr. | G01S 19/39 348/148 |
| 2016/0159395 | A1* | 6/2016 | Kim | B62D 5/0463 701/41 |
| 2016/0229399 | A1* | 8/2016 | Wada | B60W 10/18 |
| 2016/0257342 | A1* | 9/2016 | Ueda | B62D 15/026 |
| 2016/0288790 | A1* | 10/2016 | Aoki | B60W 30/165 |
| 2017/0315551 | A1* | 11/2017 | Mimura | B62D 15/025 |
| 2017/0349212 | A1* | 12/2017 | Oshida | B62D 15/0255 |
| 2018/0004205 | A1* | 1/2018 | Matsunaga | B60W 30/12 |
| 2018/0025646 | A1* | 1/2018 | Jeon | B62D 15/025 701/41 |
| 2018/0079409 | A1 | 3/2018 | Nath et al. | |
| 2018/0093709 | A1* | 4/2018 | Oguro | B60W 30/12 |
| 2018/0174459 | A1* | 6/2018 | Oh | B60W 30/10 |
| 2018/0197414 | A1* | 7/2018 | Oooka | B62D 15/025 |
| 2018/0257648 | A1 | 9/2018 | Katoh et al. | |
| 2018/0357904 | A1* | 12/2018 | Miyata | B60W 10/04 |
| 2019/0047469 | A1* | 2/2019 | Nishiguchi | B60Q 1/346 |
| 2019/0071094 | A1* | 3/2019 | Nishiguchi | B62D 15/0255 |
| 2019/0108755 | A1* | 4/2019 | Jeon | G05D 1/0061 |
| 2019/0206260 | A1* | 7/2019 | Pilkington | B60Q 1/44 |
| 2019/0225217 | A1* | 7/2019 | Tsukada | B60W 60/0053 |
| 2019/0241184 | A1* | 8/2019 | Hayashi | B60W 30/14 |
| 2019/0351901 | A1* | 11/2019 | Hori | G06T 7/60 |
| 2020/0108827 | A1* | 4/2020 | Kanoh | B60W 30/12 |
| 2020/0192396 | A1* | 6/2020 | Lee | G01S 17/931 |

FOREIGN PATENT DOCUMENTS

| | | |
|---|---|---|
| JP | 2018039285 A | 3/2018 |
| WO | 2017/064981 A1 | 4/2017 |

\* cited by examiner

[LANE BASED CONTROL]

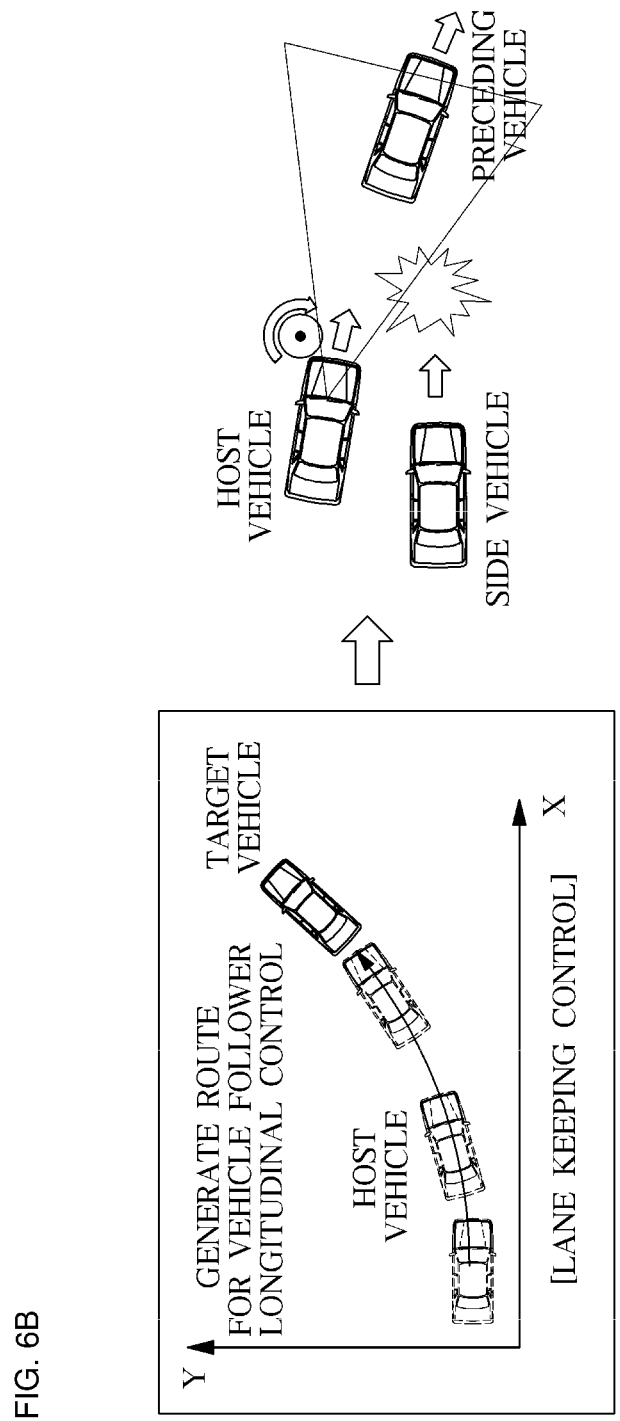

LANE KEEPING ASSIST SYSTEM AND METHOD FOR IMPROVING SAFETY IN PRECEDING VEHICLE FOLLOWER LONGITUDINAL CONTROL

CROSS-REFERENCE TO RELATED APPLICATION

This application is a Continuation Application of U.S. patent application Ser. No. 16/218,163, filed Dec. 12, 2018, which is based on and claims priority under 35 U.S.C. § 119 to Korean Patent Application No. 10-2018-0049216, filed on Apr. 27, 2018, the disclosures of each of which are incorporated herein by reference in their entireties.

BACKGROUND

1. Field

Embodiments of the present disclosure relate to a lane keeping assist system (LKAS) and a method for controlling the same, and more particularly to a lane keeping assist system (LKAS) for restricting a preceding vehicle follower longitudinal control range in a preceding vehicle follower longitudinal control process caused by disappearance or loss of a forward lane when lane keeping control is performed through recognition of a lane and a preceding vehicle, resulting in improvement in vehicle safety, and a method for controlling the same.

2. Description of the Related Art

Generally, an Advanced Driver Assistance System (ADAS) may autonomously recognize some of many situations capable of occurring during vehicle driving, and may determine what situations have occurred, such that the ADAS can autonomously control mechanical devices based on the determined situations. The Advanced Driver Assistance System (ADAS) may be implemented by integrating an Adaptive Cruise Control (ACC) system, a Lane Keeping Assist System (LKAS), and navigation information (map data, GPS data, etc.), such that the ADAS can greatly mitigate driver difficulty during vehicle driving. In this case, the ACC system may determine a preceding vehicle to be a control object using vehicle detection information sensed by one or more sensors, and may autonomously control a driving speed and a distance between a host vehicle and a peripheral vehicle through acceleration/deceleration control. The LKAS may perform lane keeping by adjusting a traveling direction of a host vehicle.

The Lane Keeping Assist System (LKAS) may detect a lane and a preceding vehicle using a front-view camera, may plan a traveling route within a lane, and may control a host vehicle to follow a target route using active control of an electronic power steering device, thereby providing a driver of the host vehicle with high convenience. If unexpected lane departure is detected, the LKAS may adjust a traveling direction of the host vehicle using active control of the electronic power steering device, such that the LKAS can assist the driver in easily driving the vehicle.

However, during lateral control based on lane recognition that is achieved through a camera as shown in FIG. 6A, when a lane capable of being temporarily recognized in road situations such as a crossroad or crosswalk is not present or deterioration of lane recognition performance occurs, the conventional LKAS may activate a function of allowing a host vehicle to follow a preceding vehicle due to the presence of a lane. In this case, when a preceding vehicle deviates from an estimated route by performing lane change during preceding vehicle follower longitudinal control as shown in FIG. 6B, an unexpected error occurs in lane keeping control, such that the conventional LKAS may have a high possibility of collision with a peripheral vehicle present in lateral directions with respect to the host vehicle.

CITED REFERENCES

Patent Documents

Korean Patent Laid-Open Publication No. 2017-0119877 (2017.10.30)

Korean Patent Laid-Open Publication No. 2017-0014163 (2017.02.08)

SUMMARY

Therefore, it is an aspect of the present disclosure to provide a lane keeping assist system (LKAS) for restricting a preceding vehicle follower longitudinal control range in a preceding vehicle follower longitudinal control process caused by disappearance or loss of a forward lane when lane keeping control is performed through recognition of a lane and a preceding vehicle, resulting in improvement in vehicle safety, and a method for controlling the same.

Additional aspects of the invention will be set forth in part in the description which follows and, in part, will be recognized by those of skill in the art upon understanding of the description, or may be learned by practice of the invention.

In accordance with an aspect of the present disclosure, a lane keeping assist system for performing lane keeping using information about a lane and peripheral vehicle includes a lane and preceding vehicle sensor configured to detect a forward lane and a preceding vehicle with respect to a host vehicle, a vehicle dynamics sensor configured to detect a driving speed, a steering angle, and a yaw rate of the host vehicle, and an electronic control unit (ECU) configured to control a traveling direction of the host vehicle in a manner that the host vehicle follows a traveling route within the detected lane, control the traveling direction of the host vehicle in a manner that the host vehicle follows the preceding vehicle when the lane is not detected, and restrict a follower longitudinal control range according to movement of the preceding vehicle.

The electronic control unit (ECU) includes a lane and preceding vehicle recognition module configured to recognize lane information and preceding vehicle information by acquiring lane and preceding vehicle detection information from the lane and preceding vehicle sensor, a route generation module configured to generate a route in a manner that the host vehicle travels in a center part based on the recognized lane information, generate a new route based on the recognized preceding vehicle information when the lane information is not recognized, and restrict a follower longitudinal control range according to movement of the preceding vehicle, and a target steering torque calculation module configured to calculate a target steering torque needed for the host vehicle following the route generated by the route generation module, and transmit the calculated target steering torque to an electronic power steering device.

The route generation module may restrict the follower longitudinal control range when the preceding vehicle deviates from the new route.

The lane information may include at least one of a horizontal position of the host vehicle located in the lane, a direction angle between the host vehicle and the lane, a curvature of the lane, and a curvature change rate of the lane. The preceding vehicle information may include at least one of a horizontal/vertical distance between the host vehicle and the preceding vehicle, a difference in proceeding direction angle, etc.

If the lane is not recognized, the route generation module may generate a virtual lane formed by extension of a legacy lane in consideration of a curvature based on finally-recognized lane information, and may generate a virtual route in a manner that the host vehicle travels in a center part of the generated virtual lane.

The route generation module may calculate a position and direction angle of the host vehicle present on the virtual route using a vehicle dynamics sensor, may calculate a horizontal position about the virtual route of the preceding vehicle by reflecting the preceding vehicle information in the calculated information, and may restrict the follower longitudinal control range when the calculated horizontal position about the virtual route of the preceding vehicle deviates from the virtual route by a predetermined horizontal distance or greater.

In accordance with another aspect of the present disclosure, a lane keeping assist method includes, if a lane keeping assist system configured to perform lane keeping using information about a lane and peripheral vehicle is turned on, detecting a forward lane of a host vehicle, controlling a traveling route of the host vehicle in a manner that the host vehicle follows a traveling route within the detected lane when the lane is detected, or generating a virtual lane when the lane is not detected in a manner that the host vehicle travels in a center part of the virtual lane, detecting a preceding vehicle located in a forward region of the host vehicle, and stopping deactivate of the lane keeping assist system when the preceding vehicle is not detected, or controlling a traveling direction of the host vehicle when the preceding vehicle is detected in a manner that the host vehicle follows the preceding vehicle according to movement of the preceding vehicle.

The virtual lane may be formed by extension of a legacy lane on the basis of finally-recognized lane information.

The lane information may include at least one of a horizontal position of the host vehicle located in the lane, a direction angle between the host vehicle and the lane, a curvature of the lane, and a curvature change rate of the lane. The preceding vehicle information may include at least one of a horizontal/vertical distance between the host vehicle and the preceding vehicle, a difference in proceeding direction angle, etc.

The controlling the traveling route of the host vehicle so as to allow the host vehicle to follow the preceding vehicle may include stopping deactivate of the lane keeping assist system when the preceding vehicle deviates from the virtual route.

The controlling the traveling direction of the host vehicle so as to allow the host vehicle to follow the preceding vehicle may include calculating a horizontal position of the preceding vehicle within the virtual route, determining whether the preceding vehicle travels in a preceding vehicle follower longitudinal control range of the virtual route on the basis of the horizontal position of the preceding vehicle in the virtual route, and controlling the traveling direction of the host vehicle when the preceding vehicle travels in the preceding vehicle follower longitudinal control range such that the host vehicle follows the preceding vehicle during traveling of the preceding vehicle, and deactivating the lane keeping assist system when the preceding vehicle deviates from the virtual route by a predetermined horizontal distance or greater.

A reference value of the follower longitudinal control range may be set to a width of a final lane centering around the virtual route.

BRIEF DESCRIPTION OF THE DRAWINGS

These and/or other aspects of the invention will become apparent and more readily appreciated from the following description of the embodiments, taken in conjunction with the accompanying drawings of which:

FIG. 6B is a conceptual diagram illustrating a method for allowing a conventional lane keeping assist system (LKAS) to perform vehicle follower longitudinal control in a lane disappearance state during lateral control based on lane recognition.

DETAILED DESCRIPTION

Advantages and features of the present disclosure and a method of achieving the advantages and features of the present disclosure will be clearly understood from embodiments described hereinafter in conjunction with the accompanying drawings. However, the present disclosure is not limited to the following embodiments and may be realized in various different forms. These embodiments are provided only to completely disclose the present disclosure and for a person having ordinary skill in the art to which the present disclosure pertains to completely understand the category of the disclosure. That is, the present disclosure is defined only by the claims. The same reference numbers will be used throughout this specification to refer to the same parts.

A lane keeping assist system (LKAS) and a method for controlling the same according to an embodiment of the present disclosure will hereinafter be described with reference to the attached drawings.

Figure 1:
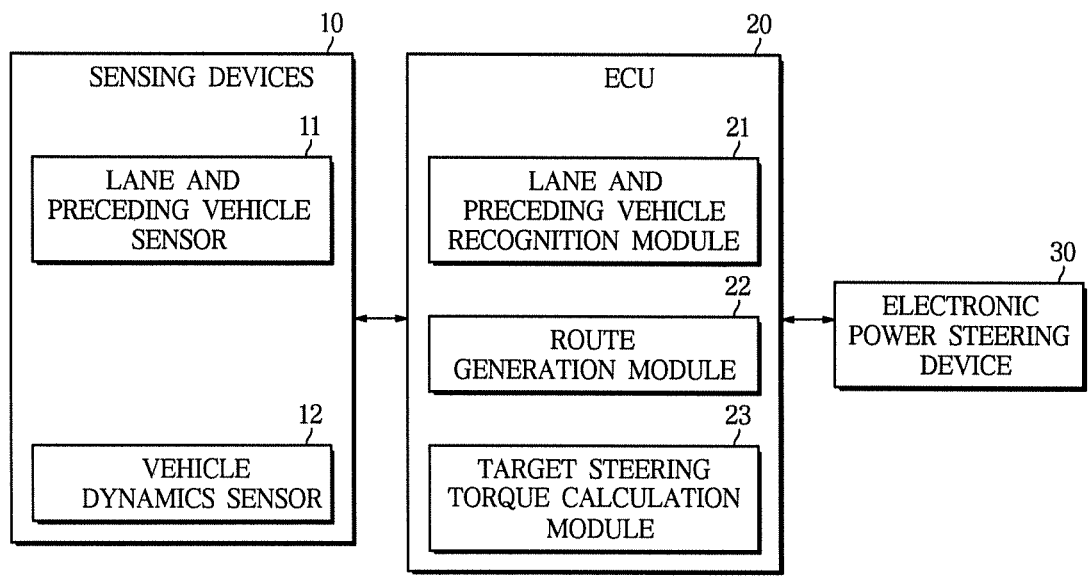
FIG. 1 is a block diagram illustrating a lane keeping assist system (LKAS) according to an embodiment of the present disclosure.

FIG. 1 is a block diagram illustrating a lane keeping assist system (LKAS) according to an embodiment of the present disclosure.

Referring to FIG. 1, the lane keeping assist system (LKAS) according to the embodiment may include a plurality of sensing devices 10, an electronic control unit (ECU) 20, and an electronic power steering device. The sensing devices 10 may include a lane and preceding vehicle sensor 11, a vehicle dynamics sensor 12, etc. The ECU 20 may include a lane and preceding vehicle recognition module, a route generation module 22, and a target steering torque calculation module 23.

The lane and preceding vehicle sensor 11 may be implemented one or more image sensors, for example, a Far Infrared Ray (FIR) camera, a CMOS camera (or a CCD camera), etc. The lane and preceding vehicle sensor 11 may be arranged at an upper end of a windshield of a host vehicle, may sense and project various kinds of light, for example, infrared light, visible light, etc., within the range of a predefined angle and a predefined distance with respect to a forward region of the host vehicle, may acquire an image of an external object located adjacent to the host vehicle, an image of a lane, etc., and may transmit the recognized images to the ECU 20.

The lane and preceding vehicle sensor 11 may be implemented as any of various well-known sensors, such as a radar sensor, a Light Detection And Ranging (LiDAR) sensor, etc. The lane and preceding vehicle sensor 11 may include a plurality of sensors. The sensors may be respectively installed at a center part of a front surface, a center part of a rear surface, and a corner part of the host vehicle, may emit electromagnetic waves within the range of a predetermined angle with respect to a forward region of each sensor, may receive electromagnetic waves reflected from peripheral objects located in the vicinity of the host vehicle, and may detect an angle, a distance, a relative speed, a relative acceleration, etc. between the host vehicle and each peripheral object, such that the sensors of the lane and preceding vehicle sensor 11 may transmit the detected information to the ECU 20.

The vehicle dynamics sensor 12 may be implemented as any of various well-known sensors, for example, a wheel speed sensor, an acceleration sensor, a yaw rate sensor, etc. The vehicle dynamics sensor 12 may be arranged at proper positions of a host vehicle, for example, a wheel, a steering wheel, or the like, such that the vehicle dynamics sensor 12 may sense a driving speed, a steering angle, a yaw rate, etc. of the host vehicle, and may transmit the sensed information to the ECU 20.

The ECU 20 of the vehicle may include a memory (e.g., DB) database such as a Read Only Memory (ROM) or Random Access Memory (RAM), may store various control data such as a lane keeping assist (LKA) program, and may further include a processor such as a CPU, such that the ECU 20 may perform various control programs. The various modules of the ECU 20 correspond to various functions performed by the processor by implementing program instructions stored in the memory based on the information received by the ECU 20 from various sensors.

When the ECU 20 actively controls a traveling direction of the vehicle to follow a traveling route within a lane detected by the sensing devices 10, if a lane capable of being temporarily recognized is not present or deterioration in lane recognition performance occurs, the ECU 20 may perform the function of activating preceding vehicle follower longitudinal control. Specifically, the ECU 20 may restrict a preceding vehicle follower longitudinal control range in a preceding vehicle follower longitudinal control process caused by disappearance or loss of a forward lane when lane keeping control is performed through recognition of a lane and a preceding vehicle, resulting in improvement in vehicle safety.

Figure 2A:
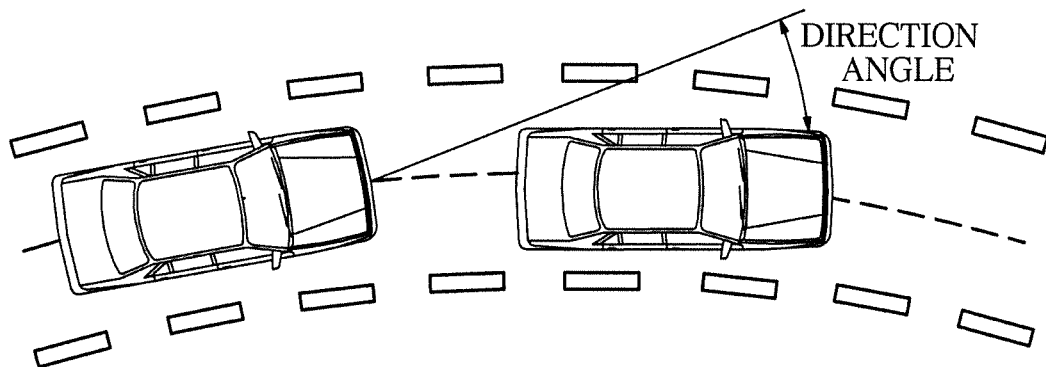
FIG. 2A is a conceptual diagram illustrating lane information recognized by a lane and preceding vehicle recognition module.
Figure 2B:
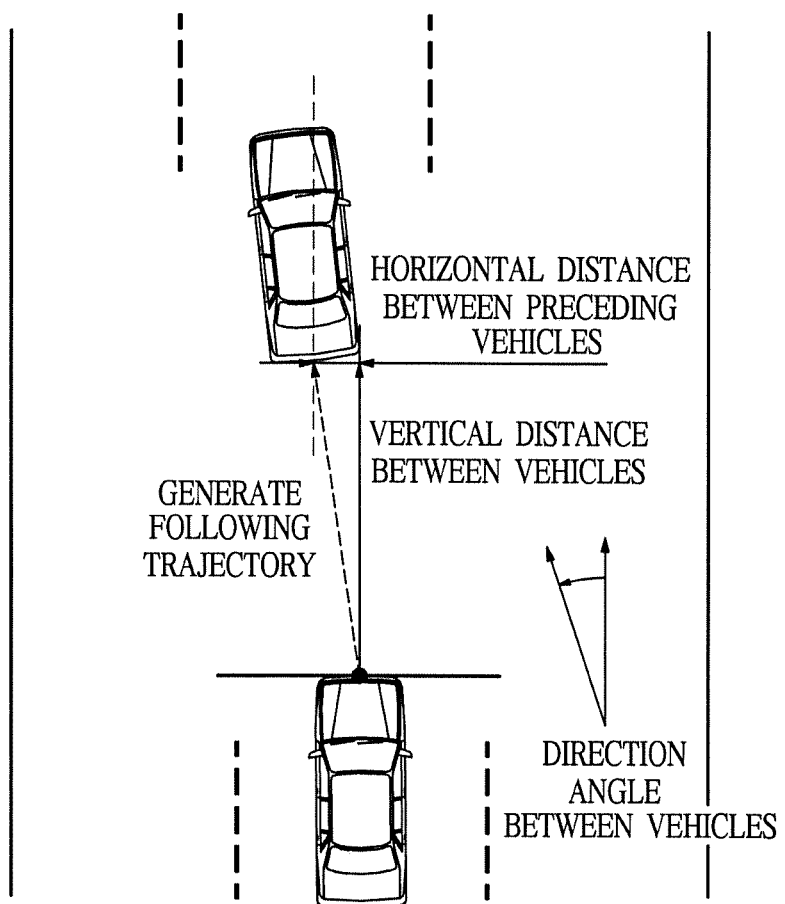
FIG. 2B is a conceptual diagram illustrating preceding vehicle information recognized by a lane and preceding vehicle recognition module.

For this purpose, the lane and preceding vehicle recognition module 21 may acquire lane and preceding vehicle sensing information from the lane and preceding vehicle sensor 11, and may recognize lane information and preceding vehicle information. For example, the lane information may include distance between the host vehicle and a left/right lane, a direction angle between the host vehicle and each lane, a curvature of a left/right lane, a curvature change rate of a left/right lane, etc. For example, the preceding vehicle information may include a horizontal/vertical distance between the host vehicle and the preceding vehicle, a difference in proceeding direction angle, etc. FIG. 2A is a conceptual diagram illustrating lane information recognized by the lane and preceding vehicle recognition module 21, and FIG. 2B is a conceptual diagram illustrating preceding vehicle information recognized by the lane and preceding vehicle recognition module 21.

Subsequently, the route generation module 22 may generate a route such that the host vehicle can travel in the center of the lane based on lane recognition information recognized by the lane and preceding vehicle recognition module 21. During lateral control based on lane recognition along the generated route, when a lane capable of being temporarily recognized is not present or deterioration in lane recognition performance occurs (for example, when a vehicle enters a lane disappearance section such as a crossroad, crosswalk, etc.), the route generation module 22 may generate a new route along which the host vehicle follows the preceding vehicle based on preceding vehicle recognition information recognized by the preceding vehicle recognition module 21. Specifically, when the preceding vehicle deviates from the generated route during the preceding vehicle follower longitudinal control (e.g., when the preceding vehicle performs lane change), the route generation module 22 may restrict the preceding vehicle follower longitudinal control range to avoid erroneous lane keeping control.

Figure 3:
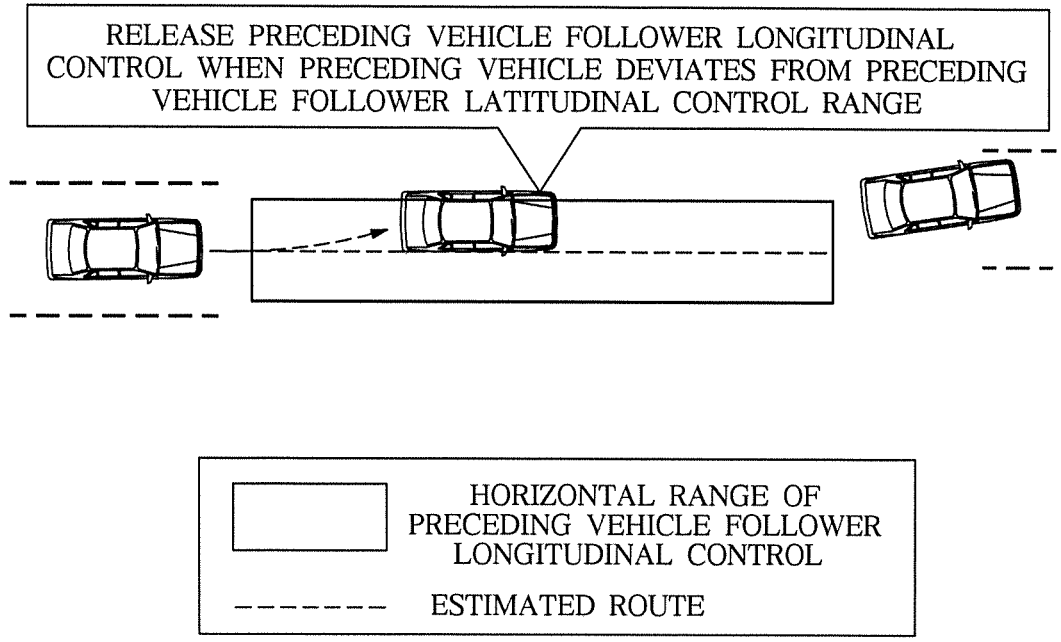
FIG. 3 is a conceptual diagram illustrating a method for deactivating preceding vehicle follower longitudinal control when a preceding vehicle deviates from a preceding vehicle follower longitudinal control range after a route generation module determines whether lane departure of the preceding vehicle has occurred using final lane information according to an embodiment of the present disclosure.

In other words, the route generation module 22 may determine whether the preceding vehicle deviates from a current lane using final lane information during preceding vehicle follower longitudinal control caused by disappearance or loss of a forward lane, and may restrict the preceding vehicle follower longitudinal control range based on the determined result. FIG. 3 is a conceptual diagram illustrating a method for deactivating preceding vehicle follower longitudinal control when the preceding vehicle deviates from the preceding vehicle follower longitudinal control range after the route generation module 22 determines whether lane departure of the preceding vehicle has occurred using final lane information according to an embodiment of the present disclosure.

Figure 4:
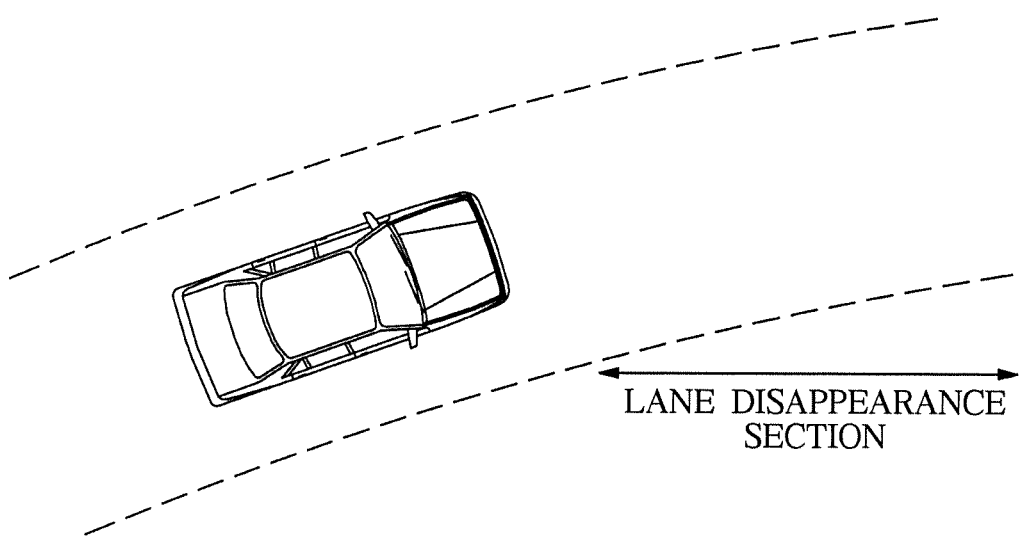
FIG. 4 is a conceptual diagram illustrating a method for allowing a route generation module to generate a virtual lane based on final lane recognition information in a lane disappearance section in which a lane is lost or washed away according to an embodiment of the present disclosure.

In more detail, the route generation module 22 may generate a virtual lane formed by extension of a conventional lane (as shown in FIG. 4) in consideration of a curvature of the conventional lane based on final lane recognition information (e.g., a horizontal position of a host vehicle within a lane, a direction angle between the host vehicle and the lane, a curvature of the lane, and a curvature change rate of the lane) recognized by the lane and preceding vehicle recognition module 21 within the lane disappearance section, and may generate a virtual route in a manner that the host vehicle can travel in the center of the virtual lane. Thereafter, the ECU 20 may calculate the position of a host vehicle in a virtual route and a direction angle of the host vehicle by accumulating a driving speed, a steering angle, a yaw rate, etc. of the host vehicle detected by the vehicle dynamics sensor 12, and may calculate a horizontal position about a virtual route of the preceding vehicle by reflecting preceding vehicle recognition information such as a horizontal/vertical distance between the host vehicle and the preceding vehicle that are recognized by the lane and preceding vehicle recognition module 21. The ECU 20 may determine whether the preceding vehicle is traveling on the preceding vehicle follower longitudinal control range of a virtual route through a horizontal position about the calculated virtual route of the preceding vehicle. If the preceding vehicle travels in the preceding vehicle follower longitudinal control range, the ECU 20 may continuously perform the preceding vehicle follower longitudinal control. During the preceding vehicle follower longitudinal control process, if the preceding vehicle deviates from the generated virtual route by a predetermined horizontal distance (i.e., if the preceding vehicle deviates from the preceding vehicle follower longitudinal control range), the ECU 20 may deactivate the preceding vehicle follower longitudinal control. In this case, a reference value of the preceding vehicle follower longitudinal control range may be set to the width of the last lane centering around a virtual route generated by the preceding vehicle follower longitudinal control range shown in FIG. 3.

The target steering torque calculation module 23 may calculate a target steering torque for following a target route generated by the route generation module 22, and may transmit the calculated target steering torque to the electronic power steering device 30.

The electronic power steering device 30 may generate a steering angle of the steering wheel upon receiving a control signal from the ECU 20, such that the electronic power steering device 30 may perform a lateral control operation.

A lane keeping assist (LKA) method using the above-mentioned system according to the present disclosure will hereinafter be described with reference to FIG. 5.

Figure 5:
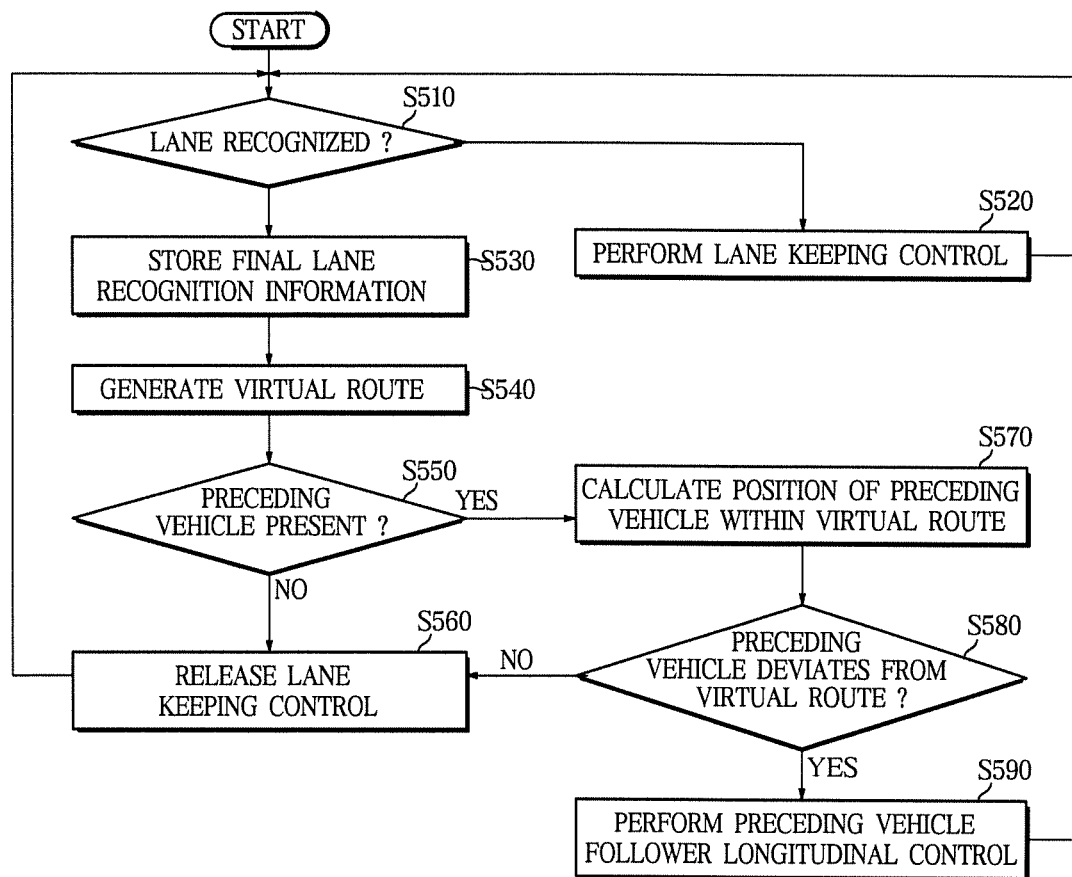
FIG. 5 is a flowchart illustrating an overall process of a lane keeping assist (LKA) method according to an embodiment of the present disclosure.
Figure 6A:
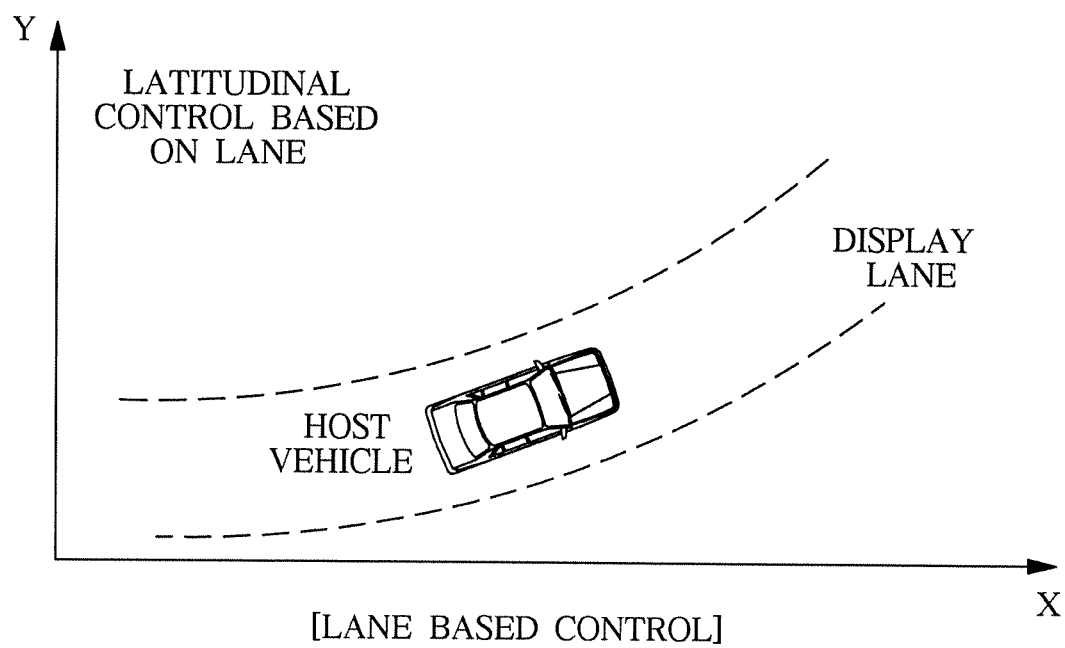
FIG. 6A is a conceptual diagram illustrating a method for allowing a conventional lane keeping assist system (LKAS) to perform lateral control based on lane recognition according to the related art.

FIG. 5 is a flowchart illustrating an overall process of a lane keeping assist (LKA) method according to an embodiment of the present disclosure.

Referring to FIG. 5, if the lane keeping assist system (LKAS) is turned on (S500), the ECU 200 may recognize a forward lane of the host vehicle using the lane and preceding vehicle sensor 11 (YES in S510), and may actively perform lane keeping control by adjusting a traveling direction of the vehicle such that the vehicle can follow the traveling route within the detected lane (S520).

If a lane capable of being recognized by the lane and preceding vehicle sensor 11 is not present or if deterioration in lane recognition performance occurs (NO in S510), the ECU 20 may store final lane recognition information (e.g., a horizontal position of the host vehicle within the lane, a direction angle between the host vehicle and the lane, a curvature of the lane, and a curvature change rate of the lane) recognized by the lane and preceding vehicle recognition module 21, and may store the stored information (S530). The ECU 20 may generate a virtual route formed by extension of a conventional lane in consideration of a curvature of the conventional lane based on the stored final lane recognition information, such that the ECU 20 may generate a virtual route in a manner that the host vehicle can travel in the center of the virtual lane (S540).

The ECU 20 may determine whether the preceding vehicle is present in a forward region of the host vehicle using the lane and preceding vehicle sensor 11 (S550). If the preceding vehicle is not present (NO in S550), the ECU 20 may deactivate lane keeping control of the lane keeping assist system (LKAS) (S560).

If the preceding vehicle of the host vehicle is detected (YES in S550), the ECU 20 may calculate a horizontal position of the preceding vehicle within the virtual route generated in step S540 (S570). The ECU 20 may determine whether the preceding vehicle is traveling within the preceding vehicle follower longitudinal control range of the generated virtual route in consideration of a horizontal position about the calculated horizontal position of the preceding vehicle (S580). If the preceding vehicle travels within the preceding vehicle follower longitudinal control range (YES in S580), the ECU 20 may perform preceding vehicle follower longitudinal control (S590). If the preceding vehicle deviates from the generated virtual route by a constant horizontal distance (i.e., if the preceding vehicle deviates from the preceding vehicle follower longitudinal control range) (No in S580), the ECU 20 may deactivate lane keeping control of the lane keeping assist system (LKAS) (S560). In this case, a reference value of the preceding vehicle follower longitudinal control range may be set to the width of the last lane centering around the generated virtual route formed as the preceding vehicle follower longitudinal control range shown in FIG. 3.

As is apparent from the above description, a lane keeping assist system (LKAS) and a method for controlling the same according to the embodiments of the present disclosure can restrict a preceding vehicle follower longitudinal control range in a preceding vehicle follower longitudinal control process caused by disappearance or loss of a forward lane when lane keeping control is performed through recognition of a lane and a preceding vehicle, resulting in improvement in vehicle safety.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. A lane keeping assist system for performing lane keeping using information about a lane and peripheral vehicle comprising:
   a lane and preceding vehicle sensor configured to detect a forward lane and a preceding vehicle with respect to a host vehicle;
   a vehicle dynamics sensor configured to detect a driving speed, a steering angle, and a yaw rate of the host vehicle; and
   an electronic control unit (ECU) configured to
      control a traveling direction of the host vehicle in a manner that the host vehicle follows a traveling route within the detected lane,
      perform a preceding vehicle following control to control the traveling direction of the host vehicle to follow the preceding vehicle if the lane is not detected, and
      restrict the preceding vehicle follower control if the preceding vehicle deviates from an expected path of travel,
   wherein the lane information includes at least one of a horizontal position of the host vehicle located in the lane, a direction angle between the host vehicle and the lane, a curvature of the lane, and a curvature change rate of the lane.

2. The lane keeping assist system according to claim 1, wherein the electronic control unit (ECU) comprises a non-transitory memory and a processor, and is configured to:
recognize lane information and preceding vehicle information by acquiring lane and preceding vehicle detection information from the lane and preceding vehicle sensor;
generate a route for the host vehicle to travel in a center part based on the recognized lane information;
generate a new route based on the recognized preceding vehicle information if the lane information is not recognized, and restrict the preceding vehicle follower control if the preceding vehicle deviates from the expected path of travel; and
determine a target steering torque needed for the host vehicle following the generated route, and transmit the determined target steering torque to an electronic power steering device.

3. The lane keeping assist system according to claim 2, wherein the ECU is configured to restrict the preceding vehicle follower control if the preceding vehicle deviates from the new route.

4. The lane keeping assist system according to claim 2, wherein:
the preceding vehicle information includes at least one of a horizontal/vertical distance between the host vehicle and the preceding vehicle, and a difference in proceeding direction angle.

5. The lane keeping assist system according to claim 4, wherein:
if the lane is not recognized, the ECU is configured to generate a virtual lane formed by extension of a legacy lane in consideration of a curvature based on finally-recognized lane information, and generate a virtual route for the host vehicle to travel in a center part of the generated virtual lane.

6. The lane keeping assist system according to claim 5, wherein:
the ECU is configured to:
determine a position and direction angle of the host vehicle present on the virtual route using the vehicle dynamics sensor,
determine a lateral position about the virtual route of the preceding vehicle by reflecting the preceding vehicle information in the calculated information, and
restrict the preceding vehicle follower control if the determined lateral position about the virtual route of the preceding vehicle deviates from the virtual route by a predetermined lateral distance or greater.

7. The lane keeping assist system according to claim 6, wherein a reference value of a lateral distance up to which the host vehicle follows the preceding vehicle based on the preceding vehicle follower control is set to a width of a final lane centering around the virtual route.

8. A lane keeping assist method comprising:
if a lane keeping assist system configured to perform lane keeping using information about a lane and peripheral vehicle is turned on, detecting a forward lane of a host vehicle;
controlling a traveling route of the host vehicle such that the host vehicle follows a traveling route within the detected lane if the lane is detected, or generating a virtual lane if the lane is not detected such that the host vehicle travels in a center part of the virtual lane;
detecting a preceding vehicle located in a forward region of the host vehicle; and
deactivating the lane keeping assist system if the preceding vehicle is not detected, or controlling a traveling direction of the host vehicle if the preceding vehicle is detected such that the host vehicle follows the preceding vehicle according to movement of the preceding vehicle,
wherein the lane information includes at least one of a horizontal position of the host vehicle located in the lane, a direction angle between the host vehicle and the lane, a curvature of the lane, and a curvature change rate of the lane.

9. The lane keeping assist method according to claim 8, wherein the virtual lane is formed by extension of a legacy lane based on finally-recognized lane information.

10. The lane keeping assist method according to claim 8, wherein:
the preceding vehicle information includes at least one of a horizontal/vertical distance between the host vehicle and the preceding vehicle, and a difference in proceeding direction angle.

11. The lane keeping assist method according to claim 10, wherein the controlling the traveling route of the host vehicle such that the host vehicle follows the preceding vehicle comprises:
deactivating of the lane keeping assist system if the preceding vehicle deviates from the virtual route.

12. The lane keeping assist method according to claim 11, wherein the controlling the traveling direction of the host vehicle such that the host vehicle follows the preceding vehicle comprises:
determining a horizontal position of the preceding vehicle within the virtual route;
determining whether the preceding vehicle travels within a lateral distance, up to which the host vehicle follows the preceding vehicle based on the preceding vehicle follower control, of the virtual route based on the determined horizontal position of the preceding vehicle in the virtual route; and
controlling the traveling direction of the host vehicle if the preceding vehicle travels within the lateral distance such that the host vehicle follows the preceding vehicle during traveling of the preceding vehicle, and deactivating the lane keeping assist system if the preceding vehicle deviates from the virtual route by a predetermined horizontal distance or greater.

13. The lane keeping assist method according to claim 12, wherein a reference value of the lateral distance is set to a width of a final lane centering around the virtual route.

14. A lane keeping assist system comprising:
an image sensor configured to detect a lane and a preceding vehicle ahead of a host vehicle; and
an electronic control unit comprising a non-volatile memory and a processor, and configured to:
receive information relating to the lane and the preceding vehicle from the image vehicle sensor,
determine whether a lane or a preceding vehicle ahead of the host vehicle are recognized,
perform, if a lane ahead of the host vehicle is recognized, lane keeping control based on the recognized lane,
generate, if a lane ahead of the host vehicle is not recognized, a virtual lane based on a final lane recognition information and information relating to motion of the host vehicle,
determine, if a preceding vehicle ahead of the host vehicle is recognized, a position of the recognized preceding vehicle within the virtual lane, perform, if a lateral distance, up to which the host vehicle follows the preceding vehicle based on the preceding vehicle follower control, of the recognized preceding vehicle is less than a threshold based on the virtual lane, preceding vehicle follower control such that the host vehicle follows the preceding vehicle, and deactivate lane keeping control if no preceding vehicle is recognized ahead of the host vehicle or if the lateral distance of recognized preceding vehicle is greater than the threshold.

15. The lane keeping assist system of claim 14, wherein the ECU is configured to generate the virtual lane by extending a legacy lane based on the final lane recognition information and a finally-recognized curvature of the legacy lane, and the ECU is further configured to generate a virtual route for the host vehicle to travel in a center part of the generated virtual lane.

16. The lane keeping assist system of claim 15, wherein the ECU is configured to:

determine a position and direction angle of the host vehicle present on the virtual route, determine a lateral position about the virtual route of the preceding vehicle based on the information relating to the preceding vehicle, and restrict the preceding vehicle follower control if the determined lateral position about the virtual route of the preceding vehicle deviates from the virtual route by more than the threshold lateral distance.

17. The lane keeping assist system of claim 14, wherein the ECU is configured to perform the preceding vehicle follower control by:

generate, if a lane ahead of the host vehicle is not recognized and a preceding vehicle is recognized, a new route based on the recognized preceding vehicle information, determine a target steering torque needed for the host vehicle to follow the generated route, and transmit the determined target steering torque to an electronic power steering device of the host vehicle.

18. A lane keeping assist system comprising:

an image sensor configured to detect a forward lane and a preceding vehicle with respect to a host vehicle; and an electronic control unit (ECU) configured to control a traveling direction of the host vehicle by:

performing lane keeping control, if a lane ahead of the host vehicle is recognized, based on the recognized lane, or if no lane ahead of the host vehicle is recognized, using preceding vehicle follower control based a recognized preceding vehicle that is within a lateral distance up to which the host vehicle follows the preceding vehicle based on the preceding vehicle follower control, and deactivating lane keeping control if no lane ahead of the host vehicle is recognized and no preceding vehicle is recognized ahead of the host vehicle, or the lateral distance of the recognized preceding vehicle is greater than a threshold, wherein the performing lane keeping control comprises:

generating, if no lane ahead of the host vehicle is recognized and a preceding vehicle is recognized, a new route based on the recognized preceding vehicle, determining a target steering torque needed for the host vehicle to follow the generated route, and transmitting the determined target steering torque to an electronic power steering device of the host vehicle.

19. The lane keeping assist system of claim 18, wherein deactivating lane keeping control comprises providing control of the host vehicle to a driver of the host vehicle.

20. The lane keeping assist system of claim 18, wherein the ECU is configured to:

generate a virtual lane by extending a legacy lane based on a finally-recognized lane and a finally-recognized curvature of the legacy lane, and generate a virtual route for the host vehicle to travel in a center part of the generated virtual lane.

21. The lane keeping assist system of claim 20, wherein a reference value of the lateral distance is set to a width of the finally-recognized lane centering around the virtual route.

* * * * *